A. V. GULLBORG.
SWIVEL COUPLING.
APPLICATION FILED APR. 21, 1919.
1,365,986.
Patented Jan. 18, 1921.
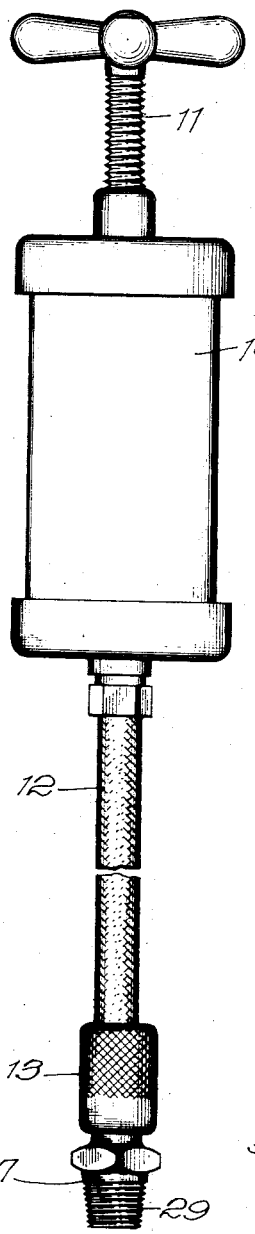
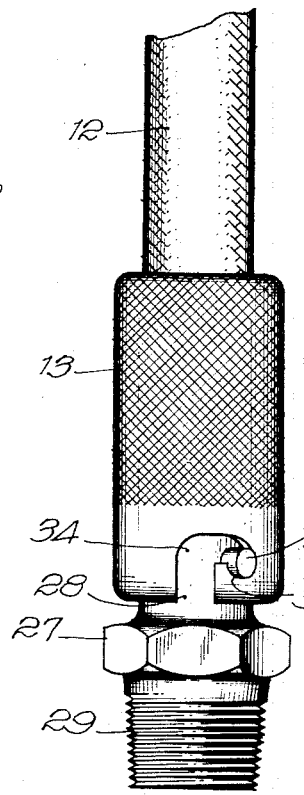
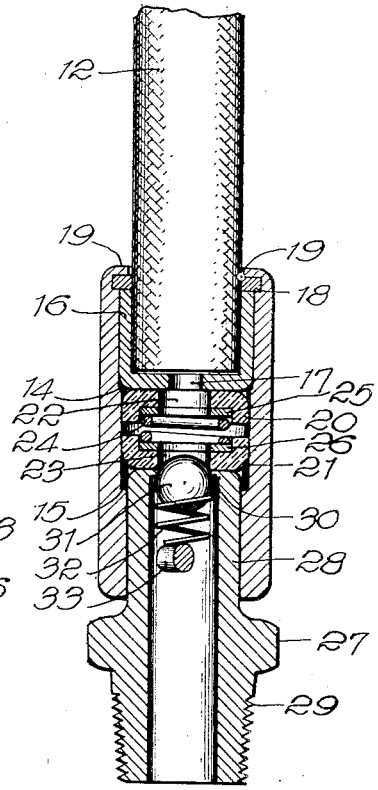
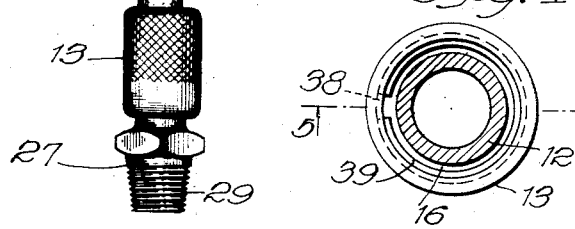
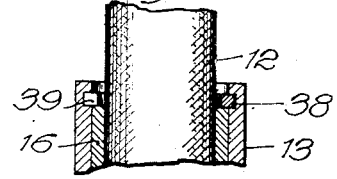

UNITED STATES PATENT OFFICE.

ARTHUR V. GULLBORG, OF CHICAGO, ILLINOIS, ASSIGNOR, BY MESNE ASSIGNMENTS, TO THE BASSICK MANUFACTURING COMPANY, A CORPORATION OF DELAWARE.

SWIVEL-COUPLING.

1,365,986.  Specification of Letters Patent.  Patented Jan. 18, 1921.

Application filed April 21, 1919. Serial No. 291,775.

*To all whom it may concern:*

Be it known that I, ARTHUR V. GULLBORG, a citizen of the United States, residing at Chicago, in the county of Cook and State of Illinois, have invented a certain new and useful Improvement in Swivel-Couplings, of which the following is a full, clear, concise, and exact description, reference being had to the accompanying drawings, forming a part of this specification.

My invention relates to improvements in swivel couplings and is especially concerned with couplings of this character designed to be used with lubricating apparatus such as that disclosed in my co-pending applications Serial Nos. 216,586 and 267,858, filed on February 11, 1918, and December 21, 1918, respectively.

The objects of my invention are:

First: to provide a swivel coupling which is simple in construction, economical to manufacture, and easy to operate;

Second: to provide a swivel coupling having the above characteristics, which will effectively resist any leakage of lubricant or other fluid even though the fluid be under high pressure; and Third: to provide a coupling member which can be quickly and easily attached to and detached from the member with which it is designed to co-act.

Other objects will appear as this description progresses, reference being had to the accompanying drawings, in which—

Figure 1 is a side elevation of a grease gun, the discharge conduit of which is provided with my improved swivel coupling, the view showing my coupling attached to a coupling member adapted to be connected to a bearing to be lubricated;

Fig. 2 is a view similar to Fig. 1, except on an enlarged scale, in which the grease gun and portion of the flexible discharge conduit are broken away;

Fig. 3 is a central longitudinal section taken on Fig. 2 in substantially the plane of the drawing;

Fig. 4 is a view showing a modified form of the means which I employ for securing one end of the flexible discharge conduit to the coupling member, this view being a section through the discharge conduit and showing the coupling member in end elevation; and Fig. 5 is a longitudinal section taken on substantially line 5—5 of Fig. 4.

Throughout the several views similar reference characters are used to refer to similar parts.

Referring to the drawings, the reference character 10 indicates the barrel of a grease gun, such as that above referred to, which is provided with a plunger (not shown) having a screwthreaded piston rod 11 and a flexible discharge conduit 12.

My improved swivel coupling for the free end of the flexible discharge conduit 12 will now be described by reference to Fig. 3, in which the reference character 13 indicates a sleeve, the bore of which is successively contracted toward the lower end of this figure, to provide shoulders 14 and 15. A metal cup 16 is rotatably mounted in the upper end of the bore of the sleeve 13, and rests against the shoulder 14. The free end of the flexible conduit 12 is soldered or otherwise secured in the cup 16, the cup 16 being provided with an aperture 17 in its bottom registering with the bore of the conduit 12. The cup 16 is retained in the sleeve 13 by means of a ring 18, over which the end of the sleeve is swaged, as shown at 19.

A pair of cup leathers 20 and 21 or other suitable gaskets are disposed in the sleeve 13 in spaced relation with their flanges extending toward each other, the cup leather 20 resting against the bottom of the cup 16 to seal the space between the outer periphery of the cup 16 and the inner wall of the bore of the tube 13, and the cup leather 21 normally resting upon the shoulder 15. The two cup leathers are provided with openings 22 and 23 respectively, which are co-axial with the opening in the bottom of the cup 16.

The two cup leathers are yieldingly held in spaced relation by means of a coil spring 24 positioned between them and having its opposite ends bearing upon the washers 25 and 26 respectively, which bear against the bottoms of the cup leathers.

In Figs. 1, 2 and 3 I have illustrated coupling members 27, which are designed to be connected to the bearings to be lubricated. These coupling members are described in my first mentioned application referred to above, and comprise briefly a tubular member 28 having one end screwthreaded, as shown at 29, and the other end flanged inwardly, as shown at 30, to provide a seat for the ball closure 31. The ball closure 31 is yieldingly held against the seat by means of a spiral spring 32 that is positioned between the ball closure 31 and a pin 33, which extends across the tubular member and through both walls thereof, the outer ends projecting from the walls of the tubular member, as shown in Fig. 2. The sleeve 13 is provided at its lower end with a bayonet slot 34, the lower side of which is recessed, as shown at 36.

When it is desired to use a grease gun equipped with my improved swivel coupling to supply lubricant to one of the coupling members 27, the sleeve 13 is brought into register with the upper end of the coupling member 27 and slipped down over it, when, by applying a slight pressure to the sleeve, the tension of the spring 24 is overcome and the sleeve moves downwardly sufficiently to permit the sleeve to be rotated sufficiently to bring the recess 36 of the bayonet slot beneath the end of the pin 33, whereupon when the pressure is released from the sleeve, the spring 24 will cause the sleeve to move upwardly and seat the end of the pin 34 in the recess 36, so as to prevent rotation of the sleeve 13. These operations move the cup leather 21 away from its shoulder 15 to substantially the position shown in Fig. 3, and also place the spring 24 under tension, thereby yieldingly holding the cup leather 20 against the bottom of the cup 16 and the cup leather 21 against the top of the coupling member 27, so as to prevent any initial flow of lubricant between these members. When the grease gun is then operated to force lubricant into the bearing under pressure, the cup leathers 20 and 21 will be tightly forced against the wall of the bore of the tube 13, and against the bottom of the cup 16 and the top of the tubular member 27. The greater the pressure exerted upon the lubricant, the tighter the cup leathers will be urged against the members specified above, and there will thus be no opportunity for the lubricant to escape past these cup leathers and out of the sleeve 13.

In Figs. 4 and 5 I have illustrated a modification of the means which I employ for securing the cup 16 in the sleeve. In these figures a recess 38 is formed in the inner wall of the bore of the sleeve for receiving the split ring 39, which is of sufficient width to project over the upper edge of the cup 16, but between the inner side of which and the flexible conduit 12 there is sufficient room to permit the ring to be sprung inwardly, so that it can be inserted into the recess 38.

While I have described the details of the preferred embodiment of my invention, it is to be clearly understood that my invention is not limited to these details, but is capable of other adaptations and modifications within the scope of the appended claims, and it is to be particularly understood that wherever I have used the words "top" or "bottom" or "upwardly" or "downwardly," these words are used in merely a relative sense and are not to be construed in their absolute sense.

Having thus described my invention, what I claim is:

1. A swivel coupling comprising a sleeve having a shoulder formed in one end of the bore thereof, means in the other end of said sleeve for receiving one end of a conduit, comprising a cup rotatably mounted in said sleeve, and opening outwardly, the bottom of said cup being perforated, a ring for engaging the edge of said cup, having its outer edge seated in the wall of the bore of said sleeve, a pair of perforated cup leathers disposed in said sleeve, with their flanges extending toward each other, and a spring located between said cup leathers and yieldingly holding one of said cup leathers against said shoulder and the other of said cup leathers against the bottom of said cup.

2. A swivel coupling comprising a sleeve having a shoulder formed in one end of the bore thereof, means in the other end of said sleeve for receiving one end of a conduit, comprising a cup rotatably mounted in said sleeve, and opening outwardly, the bottom of said cup being perforated, a pair of perforated cup leathers disposed in said sleeve, with their flanges extending toward each other, and a spring located between said cup leathers and yieldingly holding one of said cup leathers against said shoulder and the other of said cup leathers against the bottom of said cup.

3. A swivel coupling comprising a sleeve having a shoulder formed in one end of the bore thereof, means in the other end of said sleeve for receiving one end of a conduit, comprising a cup rotatably mounted in said sleeve and opening outwardly, the bottom of said cup being perforated, a pair of perforated gaskets disposed in said sleeve, and a spring located between said gaskets and yieldingly holding one of said gaskets against said shoulder, and the other of said gaskets against the bottom of said cup.

4. A swivel coupling comprising a sleeve having a shoulder formed in one end of the bore thereof, means rotatably mounted on the opposite end of said sleeve, for securing one end of a conduit, a pair of gaskets disposed in said sleeve in spaced relation, and means between said gaskets for yieldingly holding one of said gaskets against said shoulder and the other of said gaskets against said rotatably mounted means.

5. A swivel coupling comprising a sleeve, means rotatably mounted on one end of said sleeve for securing one end of a conduit, a pair of gaskets movably mounted in said sleeve in spaced relation, and means for yieldingly holding said gaskets in spaced relation.

6. A swivel coupling comprising a sleeve having an open end provided with means for making a quick detachable connection with a coupling member, a cup rotatably mounted on the other end of said sleeve, said cup opening outwardly to receive one end of a conduit, and means for holding said cup against longitudinal displacement relatively to said sleeve.

7. A swivel coupling comprising a sleeve having an open end provided with means for making a quick detachable connection with a coupling member, a cup rotatably mounted on the other end of said sleeve, said cup opening outwardly to receive one end of a conduit and means co-acting with the outer end of said sleeve and the outer end of said cup for preventing longitudinal displacement of said cup relatively to said sleeve.

In witness whereof, I hereunto subscribe my name this 16 day of April, 1919.

ARTHUR V. GULLBORG.

Witnesses:
JOHN L. STEFFEN,
GEO. P. ADAMS.